Sept. 1, 1959  J. U. DALY  2,902,089
TIME AND TIMED DELAY CONTROL
Filed Dec. 20, 1955  6 Sheets-Sheet 2

INVENTOR.
James U. Daly.
BY
Albert J. Henderson
HIS ATTORNEY.

Sept. 1, 1959 J. U. DALY 2,902,089
TIME AND TIMED DELAY CONTROL
Filed Dec. 20, 1955 6 Sheets-Sheet 4

INVENTOR.
James U. Daly.
BY
*Albert J. Henderson*
HIS ATTORNEY.

United States Patent Office 2,902,089
Patented Sept. 1, 1959

2,902,089

TIME AND TIMED DELAY CONTROL

James U. Daly, Latrobe, Pa., assignor to Robertshaw-Fulton Controls Company, Greensburg, Pa., a corporation of Delaware Application December 20, 1955, Serial No. 554,291

9 Claims. (Cl. 161—9)

This invention relates to control devices for appliance heaters, and more particularly, to timer means for controlling the cooking time for a gas range and the like and means for delaying the cooking time.

In apparatus of this general character, it is customary to provide a timer control separate and apart from the main gas control. Usually the timer controls are mounted in the back of the range resulting in the use of additional gas valves to effect time control of the main gas cock.

In gas ranges, a complicated multi-dial control system is usually employed in conjunction with the fuel system and main gas cock for controlling the "on" time cycle to a gas burner. Complications are increased with the addition of the timer means for delaying the cooking interval in the event the user plans a delayed meal. Generally, the housewife must resort to a book of instructions for each cooking and delaying operation in order to insure a complete and well-planned meal.

It is a principal object of this invention to reduce the manipulative adjustments necessary to a proper cooking and delayed cooking operation.

Another object of the invention is to arrange a timer valve and timer means within a single casing.

Another object of this invention is to permit removal of the timer without disturbing other parts of the control.

Another object of this invention is to arrange the parts compactly while insuring ready access for servicing.

In a preferred embodiment of the invention, a timer valve is located within the casing to be actuated by a pair of valve actuating mechanisms. A timer housing carried by the casing contains a pair of timer movements operatively connected to the timer valve actuating mechanism. One timer movement is adapted to actuate a novel lever arrangement for imparting movement to the timer valve to the open position. The other timer movement is adapted to actuate another novel lever arrangement to intercept the movement of the first lever arrangement to delay the time at which the first timer movement will control the timer valve.

Other objects and advantages will appear from the following specification taken in conjunction with the accompanying drawings wherein.

Figure 5:
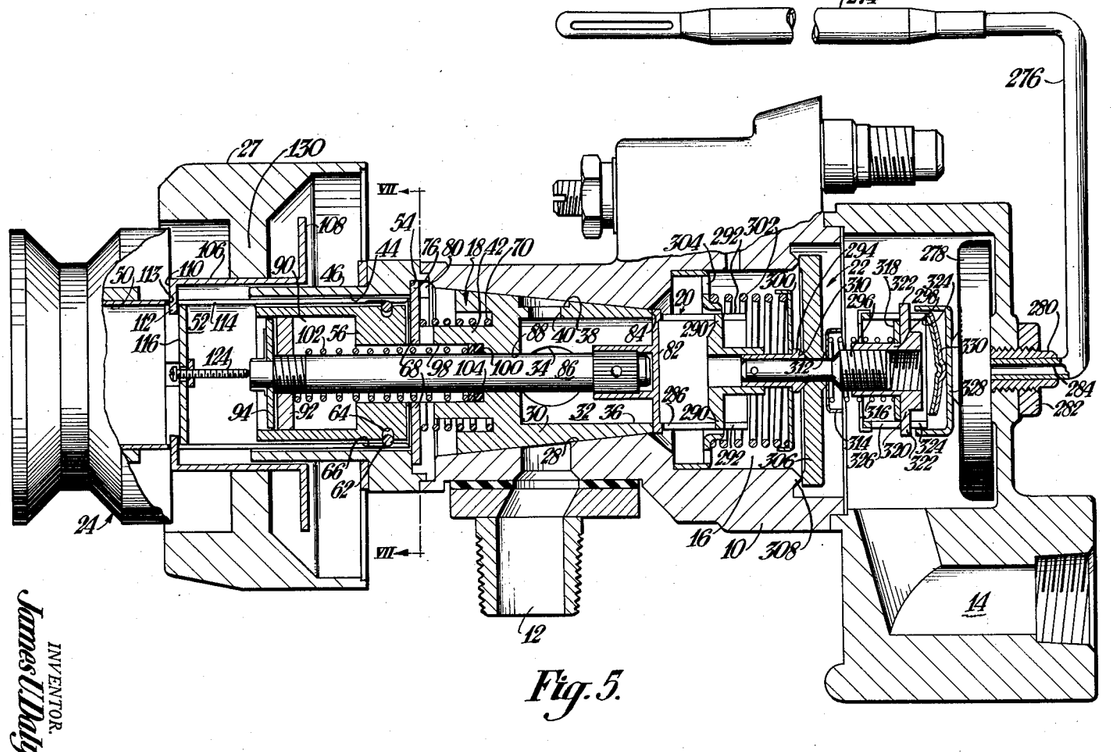
Fig. 5 is a section taken on the line V—V of Fig. 1.
Figures 6, 8:
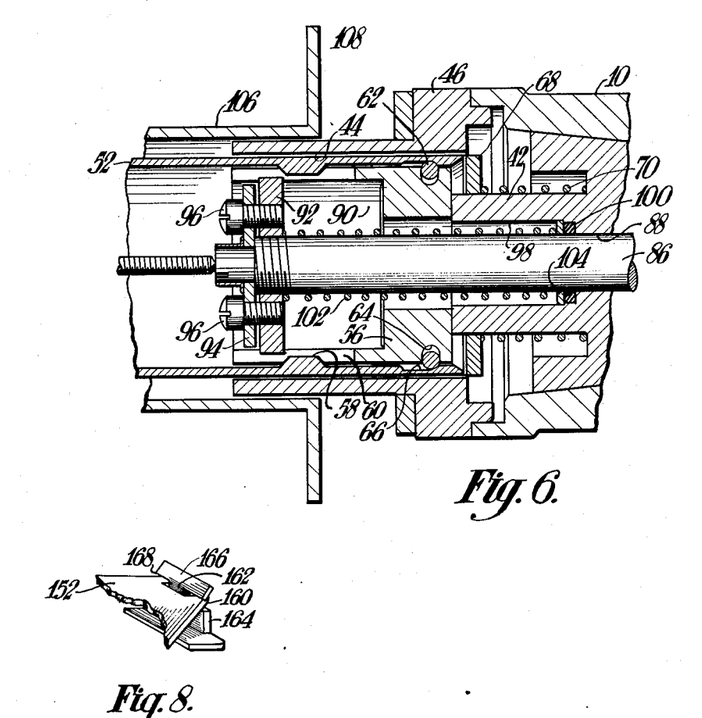
Fig. 6 is a fragmentary sectional view taken on the line VI—VI of Fig. 2.
Fig. 8 is a perspective view of a detail.
Figure 7:
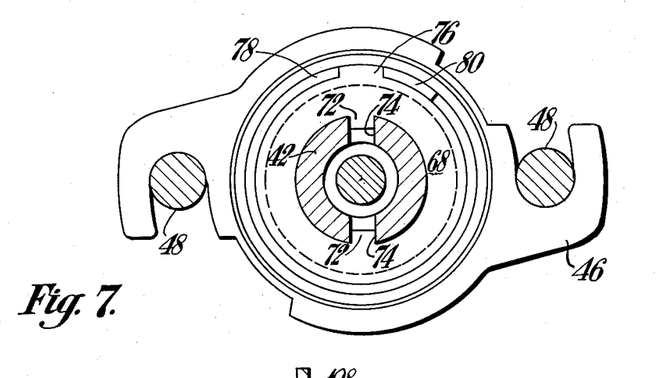
Fig. 7 is a fragmentary sectional view taken on the line VII—VII of Fig. 5.

Referring more particularly to Figs. 5, 6 and 7 of the drawings, the control device is shown as comprising a valve casing 10 provided with an inlet 12 and an outlet 14 communicating with a chamber 16 formed in the casing 10. The chamber 16 forms a passage for conveying fluid fuel from the inlet 12 to the outlet 14 and contains a plug valve 18, a timer valve 20 and a thermostatic valve 22 each of which is effective for controlling fuel flow from the inlet 12 to the outlet 14 independently of the other.

The plug valve 18 is operatively connected to a knob 24 which is imprinted with suitable indicia 25 indicating degrees of temperature adapted for registry with a reference point 26 on a mounting frame 27 for indicating the setting of the thermostatic valve 22.

The plug valve 18 comprises a tapered valve seat 28 formed in the casing 10 in the chamber 16 and adapted to be engaged by the seating surface of a plug valve member 30. The plug valve member 30 is provided with an angular passage 32 comprising an axial passage and a communicating radial passage having an inlet 34 adapted to register with the inlet passage 12 in one angular position of the plug valve member 30. The angular passage 32 is also provided with an outlet 36 which communicates with the chamber 16 in all positions of the plug valve member 30 to permit passage of gas from the inlet 12 to the chamber 16 in other positions of the plug valve member 30. An arcuate groove 38 is formed in the plug valve member 30 and is connected to the inlet 34 of the angular passage. To facilitate the passage of gas from the groove 38 to the chamber 16 through the passage 32, two additional ports 40 (only one of which is shown) may be formed in the plug valve member 30 to connect the arcuate groove 38 with the passage 32.

As is customary in gas cocks of this type the plug valve member 30 includes an imperforate seating portion adapted to extend across the casing inlet 12 in one angular position of the plug member 30 to prevent fluid flow to the passage 36 from the casing inlet 12.

An axially projecting portion of the valve member 30 forms a valve stem 42 extending through an opening 44 in a cover 46, the wall of the opening being spaced from the valve stem. The cover 46 is secured to the casing 10 by a pair of bolts 48 and is adapted to project into the interior of the frame 27 which in turn may be mounted on the front panel of a gas range or the like.

The knob 24 for mounting the valve casing 10 is formed interiorly with a recess 50 wherein a tubular projection 52 is adapted to project. The projection 52 slides within the opening 44 and terminates adjacent an annular recess 54 formed in one end of the cover 46 concentric with the opening 44. A sleeve 56 is interposed between the tubular projection 52 and the valve stem 42 and is rigidly secured to the valve stem 42 in spaced relation with the end of the plug valve member 30. As shown in Fig. 6, the tubular projection 52 is slidably keyed to the sleeve 56 by means of a pair of tangs 58 which extend from the sleeve 56 into suitable slots 60 formed in the projection 52.

Axial movement of the tubular projection 52 relative to the sleeve 56 is limited by the provision of a spring ring 62 disposed in an annular groove 64 formed in the sleeve 56. The spring ring 62 is held under radial compression by the tubular projection 52 and extends into an annular groove 66 formed in the inner surface of the tubular projection 52. The axial length of the annular groove 66 is sufficient to permit limited axial movement of the tubular projection 52 with engagement of the spring ring 62 with the end walls of the annular recess 66 defining the limits of such axial movement.

Means is provided for locking the plug valve member 30 in fluid flow preventing position with axial movement of the tubular projection 52 being effective to unlock the same. This means may take the form of a generally annular locking plate 68 mounted in the valve stem 42 between the projection 52 and the valve plug member 30.

The locking plate 68 is slidable on the valve stem 42 and is biased into engagement with the cover 46 by a spring 70 seated on the valve element 30, the spring 70 thus serving to hold the plug member 30 on its seat 28. As best shown in Fig. 7, rotational movement of the locking plate 68 relative to the valve stem 42 is prevented by a pair of oppositely disposed lugs 72 which extend into a pair of oppositely disposed slots 74 formed in the valve stem 42.

The locking plate 68 is also provided with a radially outward extending lug 76 which is disposed within the recess 54 formed in the cover 46. The recess 54 is provided with a cam surface 78 and a limit stop 80 in the form of projections thereon and spaced one from the other to accommodate the lug 76 therebetwen. The crest of the cam surface 78 is adjacent the space for the lug 76 whereby the latter may ride up and drop into the space when the valve stem 42 is rotated in a clockwise direction as viewed in Fig. 7. Preferably the limit stop 80 is of such height as to extend into sufficiently close proximity to the casing 10 to prevent the lug 76 from passing therebetween and continuing the clockwise rotation.

In operation, the lug 76 is disposed between the cam surface 78 and the limit stop 80 when the plug valve member 30 is in its fluid flow preventing position. To rotate the plug member 30 to a fluid flow permitting position, the knob 24 is depressed to move the tubular projection 52 into engagement with the locking plate 68 to thereby move the same against the bias of the spring 70 to a position where it will clear the cam surface 78. The knob 24 may then be rotated in a clockwise direction to transmit torque to the valve member 30 through the tubular projection 52, sleeve 56, and valve stem 42. When the knob 42 is so moved, the lug 76 of the locking plate 68 will ride along the cam surface 78 with further rotation of the knob being uninhibited until the lug 76 abuts the limit stop 80.

The timer valve 20 comprises a valve element 82 disposed within the chamber 16 and movable relative to an annular valve seat 84 formed on the end of the plug valve member 30. The valve seat 84 surrounds the outlet 36 of the angular passage 32 so that engagement thereof by the valve element 82 is effective to prevent fluid flow through the passage 32.

The valve element 84 is mounted on one end of a valve stem 86 which is slidably mounted in an axially extending bore 88 formed in the valve stem 42, the other end of the valve stem 86 extending out of the plug valve stem 42 and being disposed within a recess 90 formed in the sleeve 56.

The valve stem 86 is axially movable relative to the valve stem 42 but is restrained from rotational movement relative thereto by a collar 92 clamped on the valve stem 86 and keyed into the slots 60 of the sleeve 56. The collar 92 is threaded on the valve stem 86 and is adapted to be locked in a predetermined angular position relative thereto by clamping means. Such means is here shown as a second collar 94 rotatably mounted on a reduced end portion of the valve stem 86 and connected to the collar 92 by a pair of screws 96. The screws 96 extend through suitable apertures formed in the collar 94 and are threaded into the collar 92 to effect the locking of the collar 92 on the threaded portion of the valve stem 86 when the screws 96 are drawn up.

The bore 88 formed in the valve stem 42, is provided with a counterbore 98 in which is positioned an annular sealing element 100. The sealing element 100 encompasses the valve stem 86 and is held in sealing engagement therewith by a spring 102 acting between the collar 92 and a washer 104 positioned in the counterbore 98 in abutting relationship with the sealing element 100. The spring 102 also biases the valve stem 86 to the left as viewed in Fig. 5 and thus biases the valve element 82 toward its seat 84.

It will be apparent that the forces exerted by the spring 102 will, at all times, be confined within the assembly of the plug member 30 and the valve stem 42 and will not serve to urge the plug member 30 toward the seat 28. It will be apparent that the forces are so confined even when an operative connection is established between the knob 24 and the valve stem 86 because of the fact that the locking plate 68 and tubular projection 52 are not connected to each other. Consequently, the biasing force exerted by the spring 70 and urging the plug member 30 into engagement with its tapered seat 28 remains substantially constant, the spring 102 being ineffective to add to such biasing force and the danger of excessive pressure between the tapered seating surfaces being eliminated.

Means for moving the valve member 82 relative to the valve seat 84 is provided and is here shown as including a movable mechanism operatively engageable with the valve stem 86. The movable element comprises a thrust sleeve 106 which is slidably received on the cover 46 and terminates at one end in an outwardly extending flange 108, and at the other end at an inwardly extending radial flange 110. A plurality of lugs 112 project radially inward of the flange 110 and are adapted to be slidably received in a plurality of complementary slots 114 formed in the tubular projection 52. The lugs 112 serve to limit the movement of the sleeve 106 between the extremities of the slots 114.

Figure 9:
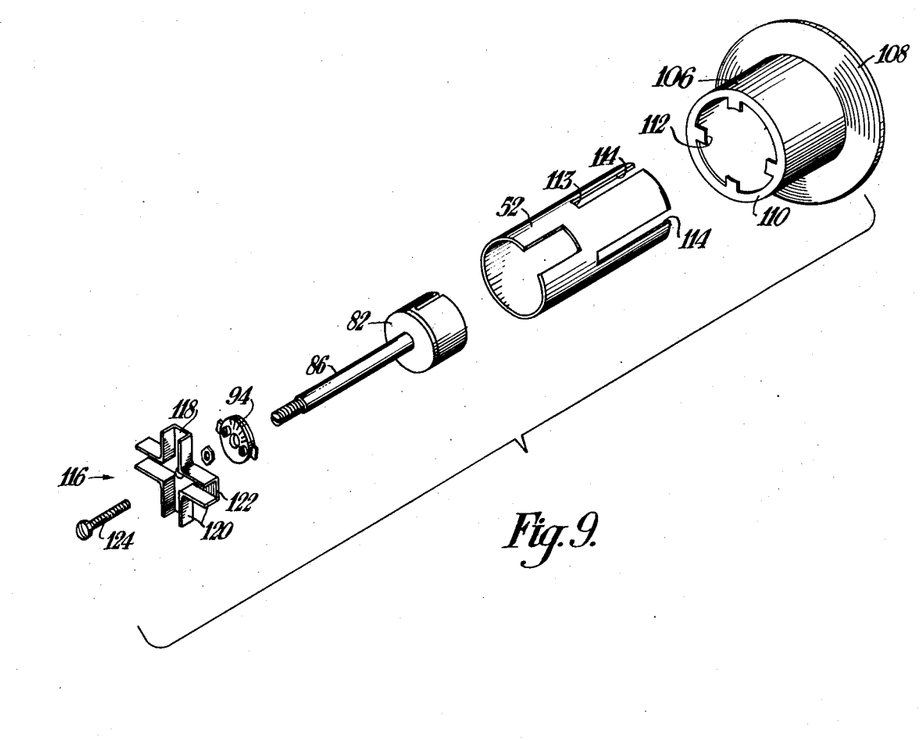
Fig. 9 is a perspective view of a portion of the valve actuating mechanism showing the parts separated.

Disposed within the recess 90 of the tubular projection 52 and adapted for relative slidable movement thereof is a crosspiece 116 comprising a plurality of U-shaped channel members 118 each of which being provided with sides 120 and bight portions 122. The bight portions 122 of each channel member 118 are adapted to underlie a lug 112 to be moved therewith for a purpose to be described hereinafter. As shown in Figs. 5 and 9, a screw 124 is threadedly received in the central portion of the crosspiece 116 and is adapted to abut the end of the valve stem 86. The length of the screw 124 and the slots 114 are designed so that the valve spring 102 will bias the crosspiece 116 to the left as viewed in Fig. 5 and hold the sleeve 106 in a position wherein the lugs 112 abut the end walls 113 of the slots 114.

In operation, the lugs 112 are disposed against the bight portions 122 of the channel members 118 for all positions of the sleeve 106. To move the timer valve member 82 away from its seat 84, the sleeve 106 is depressed to move the lugs 112 and consquently the crosspiece 116 and the screw 124 to the right as viewed in Fig. 5. Movement of the screw 124, which is in continuous engagement with the valve stem 86 carries the same therewith thus disengaging the valve member 82 from the seat 84.

Figure 4:
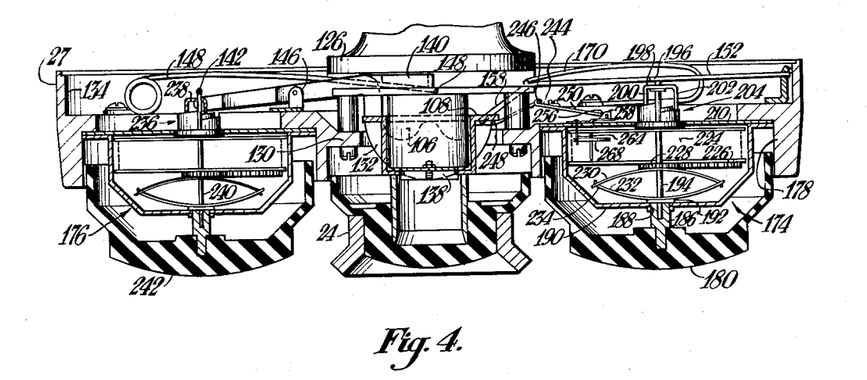
Fig. 4 is a section taken on the line IV—IV of Fig. 3.

As shown in Fig. 4, the casing 10 includes a clamping plate 126 which may be welded or otherwise secured to the cover 46. The plate 126 is in turn fastened by a pair of screws 128 to a mounting bracket 130 formed integral of the mounting frame 27 and which serves to support the casing 10 and the timing mechanism for the timer valve 20 as will presently appear.

Figure 3:
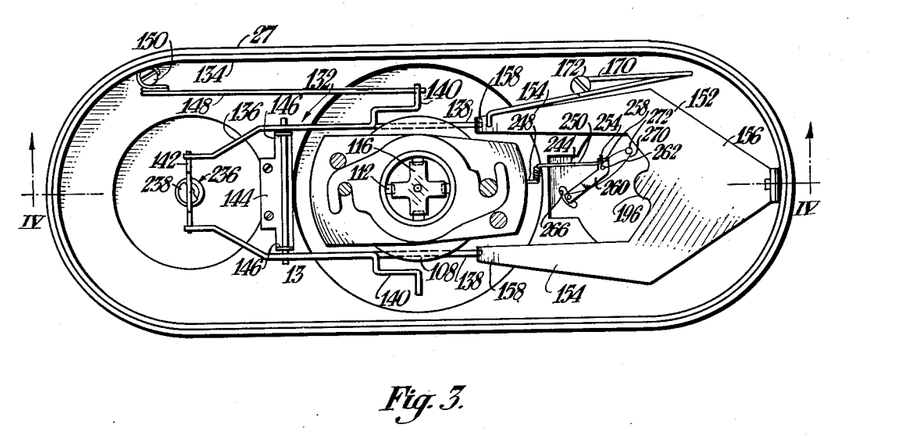
Fig. 3 is a view similar to Fig. 1 with the valve casing removed to illustrate the valve actuating mechanism.

Means for moving the sleeve 106 relative to the casing 10 and consequently the valve member 82 relative to the valve seat 84 is provided and is here shown as including a thrust lever 132 disposed within a recess 134 formed in the frame 27. As shown in Figs. 3 and 4, the lever 132 is formed with a pair of legs 136 each having a semicircular portion 138 which is adapted to abut the flange 108 of the thrust sleeve 106. Extending in overlying relation to the portions 138 are a pair of extensions 140 formed integral with the legs 136. A brace 142 serves to connect the legs 136 at one end remote from the semicircular portions 138 and a similar brace 144 is connected between the legs 136 at a point intermediate the ends thereof.

The lever 132 is pivotally connected at a point below the brace 144 to a pair of ears 146 on the frame 27 and the arrangement of the lever 132 is such that rotation thereof in a counterclockwise direction, as viewed in Fig. 4, will actuate the thrust sleeve 106 axially to lift the valve member 82 away from the seat 84. A hair spring 148 anchored at one end to the frame 130 by a screw 150 and connected at the other end to the extension 140, normally biases the lever 132 in a counterclockwise direction to open the valve member 82.

Also disposed within the recess 134 of the frame 27 is a transmission lever 152 having a pair of legs 154 and a bight portion 156 connecting the legs 154 at the ends thereof. The other ends of the legs 154 are turned downwardly at 158, as viewed in Fig. 4, and are adapted to engage the semicircular portions 138 of the lever 132. The end of the lever 152 remote from the turned down ends 158 is bifurcated at 160 for receiving the trunk stem 162 of a T-shaped bearing plate 164 secured to the frame 27 by any suitable means. The cross plate 166 of the plate 164 includes a pair of bearing surfaces 168 which are adapted to engage and limit the upward movement of the bifurcated end 160 of the lever 152 thereby serving as a pivotal connection for the lever 152 relative to the frame 27 and the lever 132.

A hair spring 170 having one end anchored by a screw 172 to the frame 27 and the other end in engagement with the top surface of one of the legs 154 serves to bias the lever 152 in a counterclockwise direction, as viewed in Fig. 4. The arrangement of the lever 152 is such as to oppose rotation of the lever 132 under action of the spring 148, however, for purposes of this invention, the spring rate of the spring 170 is made less than that of the spring 148, and that the combined force of the valve spring 102 and the spring 170 is sufficient to overcome the single effect of the spring 148 for a purpose which will appear hereinafter. However, the force of the spring 148 is sufficient to overcome the spring 102 during one phase of operation of the present invention as will presently appear.

The mounting frame 27 substantially encloses the apparatus for controlling the pivoting of the levers 132 and 152 for controlling the seating and unseating of the valve member 82. Such apparatus includes a valve actuating clock mechanism generally indicated by the reference numeral 174 associated with the transmission lever 152 and a delayed time clock mechanism generally indicated by the reference numeral 176 and associated with the thrust lever 132. The clock mechanisms 174 and 176 are structurally identical, therefore, only the clock mechanism 174 will be discussed in detail.

Figure 10:
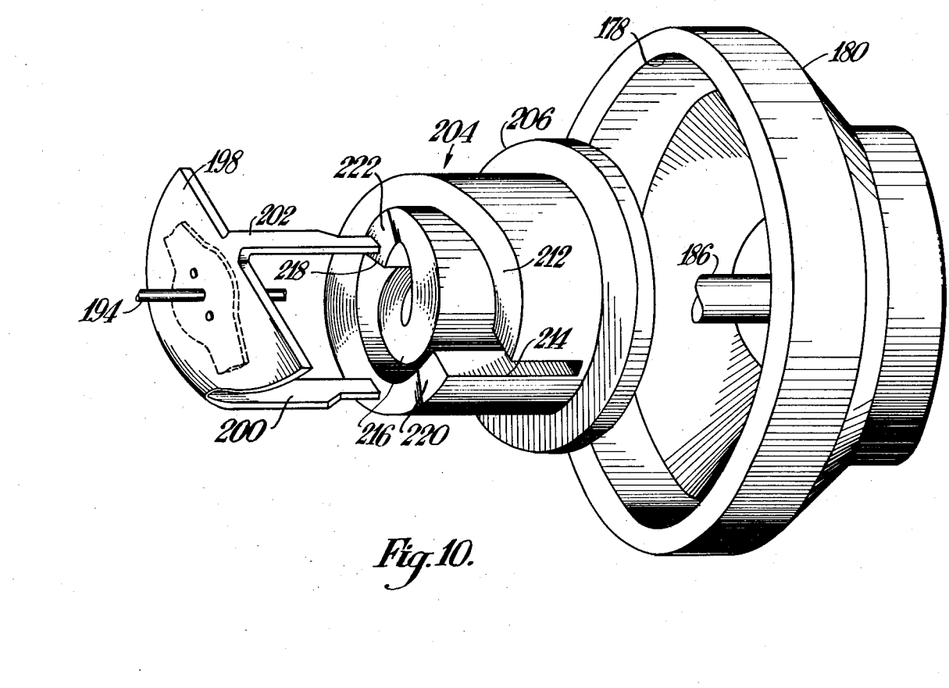
Fig. 10 is a perspective view of a timer controlled detent mechanism utilized in the present invention.

Referring to Figs. 3, 4 and 10, the clock mechanism 174 is disposed within a chamber 178 formed in the frame and a time-setting knob 180 having an outer configuration adapted to be grasped by the hand of a user for manual manipulation. Suitable indicia 182, indicating units of time, are imprinted on the edge of the knob 180 for registry with a suitable reference mark 184 on the frame 27 for a purpose which will more fully appear hereinafter. Detachably secured to the central portion of the knob 180 and projecting inwardly therefrom is a shaft 186 which is adapted for axial and rotative movement. The shaft 186 is slidably received in an opening 188 formed in a cup-shaped housing 190 secured to the frame 27 within the chamber 178, by any suitable means. A collar 192 on the inner end of the shaft 186 limits the outward movement of the shaft 186 and the knob 180 but allows relative inward movement of the same.

An operating shaft 194 is rigidly secured to the shaft 186 and projects axially relative thereto into the interior of the housing 190 for engagement with a tongue 196 extending from the bight portion 156 of the transmission lever 152. It will be apparent from the construction and arrangement of the parts so far described, that the knob 180 may be moved axially to effect rotation of the lever 152 in a clockwise direction against the bias of the spring 170 and free the lever 132 for counterclockwise rotation under the bias of the spring 148 with the consequent axial movement of the thrust collar 106, thereby actuating the valve member 82 from its seat 84.

Secured to the inner end of the shaft 194 adjacent a tongue 196 formed medially of the lever 152 is a plate 198 which carries a pair of oppositely disposed abutment means or followers which take the form of projections 200, 202 extending from the plate 198 and disposed parallel to the axis of the shaft 194. The follower 200 is positioned slightly farther from the axis of the shaft 194 than is the follower 202 for a purpose which will more fully appear hereinafter.

A relatively stationary detent member is engageable with the followers 200, 202 for preventing axial movement of the shaft 194 and comprises a generally annular cam assembly 204 secured to the inside of the chamber 176. The cam assembly 204 includes a radial flange 206 which is adapted to be seated in a suitable opening 208 formed in a wall 210 of the housing 190.

As shown in Fig. 10, an annular body portion of the cam assembly 204 extends axially from the flange 206 with the end portion thereof being adapted to define a first helical surface 212. The helical surface 212 extends through approximately 350° with the high and low extremities thereof separated by a relieved portion or recess 214 which extends parallel to the axis of the shaft 194 and is adapted to receive the follower 200 of the plate 198. Coaxial with and positioned radially inward of the helical surface 212 is a second helical surface 216 which extends through approximately 350° with the high and low extremities thereof being separated by a relieved portion or recess 218 and is adapted to receive the follower 202 of the plate 198. Preferably each helical surface 212, 216 terminates in a portion 220, 222 disposed normal to the axis of the cam assembly 204 to provide a manual setting as will more fully appear.

The lead of the helical surface 212 is the same as the lead of the helical surface 216, however since the helical surface 212 is disposed radially outward of the helical surface 216, it will be apparent that the helix angle of the former will be smaller than the helix angle of the latter. The shaft 194 extends slidably and rotatably through the open center of the annular cam assembly 204 so that axial movement of the shaft 196 in one direction is limited by engagement of the followers 212, 216 with the cam assembly 204.

The length of the actuating shaft 194 is such that, when the followers 200, 202 are positioned within the recesses 214, 218 respectively, the combined effect of the spring 170 and the valve spring 102 will rotate the lever 132 in a clockwise direction, as viewed in Fig. 4, to effect closing of the valve member 82. However, when the shaft 194 is moved axially to move the followers 200, 202 out of the recesses 214, 218, the shaft 194 is moved against the bias of the spring 170 to permit counterclockwise rotation of the lever 132 and the valve member 82 is moved upon its seat 84, thereby preventing fuel flow through the annular passage 34 in the plug valve member 18. If the shaft 194 is rotated after it has moved the valve member to open position, the followers 200, 202 will engage the helical surfaces 212, 218 and the valve member 82 will be retained in its open position.

It will be apparent that the axial thrust exerted on the shaft 194 by the spring 170 will be transmitted directly to the shaft 194 and to the followers 200, 202 carried thereby. Since the helical surfaces 212, 216 are disposed at an angle to the line of action of this force, a portion of the force will be transformed to torque and will tend to rotate the shaft 194 with accompanying slidable movement of the followers 200, 202 down the helical surfaces 212, 216, respectively. However, the helical surfaces 212, 216 will exert a reactive force on the followers 200, 202, a portion of which will comprise a torsional component acting in a direction to resist such sliding action of the followers 200, 202.

It is an important feature of this invention that the coacting surfaces of the followers 200, 202 and the relatively stationary cam assembly 204 be so arranged that the operating force acting upon the movable member 194 will produce a component of force substantially equal in magnitude and opposite in direction to the reactive component of force resulting from friction between such surfaces regardless of the magnitude of the operating force of the spring 170. With such an arrangement, an extremely small force may be utilized to disengage the movable element 194 from the stationary or detent element 204.

As previously stated, the helix angle of the surface 212 is smaller than the helix angle of the surface 216. It is desirable that the resistive force produced by the frictional engagement of the follower 200 upon the surface 212 be slightly greater than the force which tends to move the follower 200 along the helical surface 218. Accordingly, the helical surface 212 is formed with a relatively small helix angle selected to produce the desired resistance to slidable movement.

In order to balance these tendencies, the helix angle of the surface 216 is made slightly larger so that the force tending to produce slidable movement between the follower 202 and the surface 216 is slightly greater than the resistive force tending to inhibit this slidable movement.

From the foregoing, it will be apparent that the total torque acting on the shaft 194 as a result of the axial load thereon will be determined by the summation of the tendency toward slidable movement produced by engagement of the follower 202 with the helical surface 216 and the tendency to resist slidable movement produced by the engagement of the follower 200 with the helical surface 212. For purposes of this invention, the helix angles of the surfaces 212, 216 are selected to produce a balanced condition with the moment exerted on the shaft 194 by the follower 200 being substantially balanced by the moment exerted on the shaft 194 by the follower 202. Thus, rotation of the shaft 194 may be effected by the application thereto of a relatively small torque without regard to the magnitude of the axial thrust on the shaft 194 by the biasing effect of the spring 170.

Means is provided for applying a control force to effect release of the movable operating member 194 from the detent member 204 for permitting actuation of the valve member 82. This means takes the form of an escapement controlled clock movement generally indicated by the reference numeral 224 mounted on the wall 210 by any suitable means and within the housing 190. The movement 224 may be of any conventional type and is shown here as including a driven gear 226 which meshes with a pinion 228 and is adapted to slidably and rotatably receive the shaft 194 so that the same may move axially relative to the pinion 228 while a torque transmitting relation is maintained therebetween. This connection is here shown as comprising a first leaf spring 230 secured at its medial portion to the pinion 228 and a second leaf spring 232 secured at its medial portion to the shaft 194 adjacent the collar 192. The juxtaposed ends of the leaf springs 230, 232 are connected together at 234 so that rotational movement will be transmitted between the pinion 228 and the shaft 192 but, upon axial movement of the shaft 194, the springs 230, 232 will flex, causing no axial displacement of the pinion 228.

As previously stated, the delayed time clock mechanism 176 is similar to the clock mechanism 174 and includes a similar detent cam assembly 236 and a follower plate 238 for actuating an operating shaft 240 for controlling the rotation of the thrust lever 132. The inner end of the shaft 240 is operatively engageable with the brace 142 of the lever 132 and is adapted to be axially moved by manually depressing a knob 242 connected to the shaft 240 to effect clockwise rotation of the lever 132. Suitable indicia 241, indicating units of time, are imprinted on the edge of the knob 242 for registry with a reference mark 243 on the frame 27.

To complete the timing mechanism for controlling the actuation of the timer valve 20, a braking apparatus is provided for preventing the actuation of the clock movement 174 when the clock movement 176 is in operation or when the valve member 82 is in closed position. As shown in Figs. 3 and 4, such apparatus takes the form of a lever 244 pivotally mounted on an ear 246 on the frame 27 adjacent the lever 152. The lever 244 is in the form of an angularly shaped hair spring and is so mounted on the ear 246 as to be biased in a clockwise direction, as viewed in Fig. 4, whereby an arm 248 of the lever 244 is biased against the under surface of the flange 108 of the sleeve 106. The other arm 250 of the spring lever 244 terminates in a cam follower 254 which is adapted to ride up and down an inclined plane 256 formed on an upturned end 258 of a braking lever 260 pivotally connected to the frame 27 by a shaft 262. The other end of the braking lever 260 has secured thereto a braking pin 264 which extends downwardly through an arcuate slot 266 formed in the wall 210 and adapted to engage an escapement wheel 268 of the clock movement 224. A hair spring 270 anchored by a screw 272 to the frame 27 and connected to the lever 260 biases the same in a counterclockwise direction as viewed in Fig. 3 for holding the pin 264 in engagement with the escapement wheel 268 for preventing rotation thereof and actuation of the movement 174.

In operation, the arm 248 of the lever 244 is adapted to engage the flange 108 of the thrust sleeve 106 and be movable therewith. When the clock movement 176 is in operation to hold the semicircular portion 138 of the lever 132 downward, the thrust sleeve 106 is held in a downward position under the influence of the valve spring 102. In this position of the sleeve 106, the arm 248 of the lever 244 is likewise held downward thereby disengaging the follower 254 from the inclined plane 256 for permitting counterclockwise rotation of the lever 260 under the influence of the spring 270.

Such action of the lever 260 forces the pin 264 against the escapement wheel 268 for frictionally holding the wheel in an inoperative position. When the sleeve 106 is permitted to move upwardly, the lever 244 will rotate in a clockwise direction causing the follower 254 to ride down the inclined plane 256 and rotate the lever 260 in a clockwise direction. In this manner, the pin 264 is moved away from the wheel 268, and as will presently appear, will do so with a snap action to effect a slight torque upon the periphery of the wheel 268 to assist in initiating actuation of the clock movement 174.

*Thermostatic valve*

The thermostatically controlled valve unit 22 for the embodiment herein disclosed comprises a bulb 274, which is adapted to be located in a space to be heated, and a tube 276 operatively connected to an expansible and contractible power element 278 housed within the casing 10. In this instance, the end of the tube 276 adjacent the power element 278 is secured in sealing engagement with a stud 280 which projects from the casing 10 and is secured thereto by means of a nut 282. The inner end of the stud 280 abuts the power element 278 and is provided with a passageway 284 affording communication between the tube 276 and the interior of the power element 278. The control assembly comprising the bulb 274, tube 276, and power element 278 is filled with a liquid which, upon changes in temperature sensed by the bulb 274 will serve to expand and contract the power element 278 as is well known to those skilled in the art.

The timer valve member 82 is provided with an axially extending cylindrical projection 286 formed to receive the end of a valve shaft 288 which is adapted for longitudinal movement therein, being prevented from rotation relative to the valve member 82 by means of a pair of oppositely disposed tangs 290 projecting therefrom into engagement with a pair of slots 292 formed in the cylindrical projection 286. The valve shaft 288 is provided, intermediate its ends, with an enlarged portion 294 having a tapered face formed on one side thereof. The end 296 which projects beyond the enlargement 294 is threaded into a thimble 298. The shoulder formed by the enlarged portion 294 is designed to afford an abutment for an annular spring seat 300. A coil spring 302 engages, at one end, with the spring seat 300 and the other end abuts a spider 304 which is seated on the casing 10.

Communication through the chamber 16 between the timer valve device 20 and the outlet passage 14 is controlled by a valve member 306 which is loosely mounted on the shaft 288 between the enlarged portion 294 and the threaded end 296 and is adapted to engage a valve seat 308 formed on the casing 10. Engagement of the valve member 306 with the valve shaft 288 is effected by the provision of a centrally located tapered seat 310 on the valve member 306 which seat is preferably ground and lapped into sealing engagement with the tapered face of the enlarged portion 294.

Figure 1:
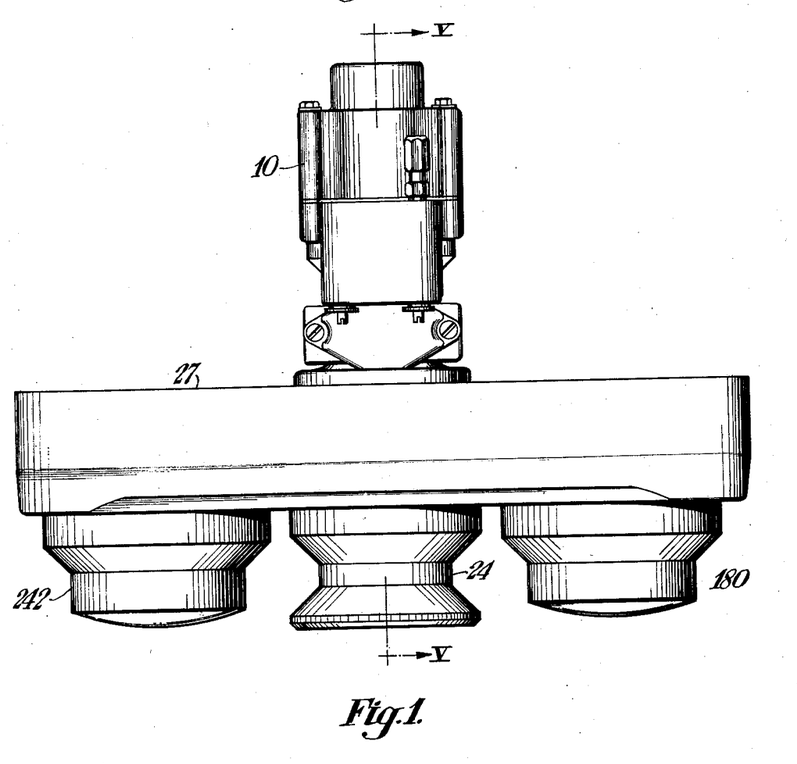
Fig. 1 is a plan view of a control valve embodying this invention.

It will be apparent that movement of the power element 278, when undergoing expansion, is toward the left as viewed in Fig. 1 and that seating movement of the valve member 306 is also in this direction. Hence, the valve member 306 and the power element 278 work in opposition to each other due to the fact that the expansive movement of the power element 278 is in a direction tending to force the valve member 306 against the bias of the spring 302 and toward the valve seat 308.

To prevent damage to the valve member 306 upon excessive expansion of the power element 278, the valve member 306 is provided on the side opposite the tapered seat 310 with a raised boss 312 forming an abutment for a cup-shaped washer 314 loosely mounted on the shaft 288 adjacent the valve member 306. One end of a coil spring 316 abuts the washer 314 and the other end thereof engages the bottom exterior surface of a cup-shaped element 318 which is fitted over a flange 320 formed on the thimble 298.

A pair of radially extending lugs 322 are formed on the flange 320 to extend through suitable slots 324 formed in the cup-shaped element 318 and into apertures 326 formed in the walls of a second cup-shaped element 328. The cup-shaped element 328 is secured to the power element 278 by welding or the like so that engagement thereof with the lugs 322 prevents rotation of the thimble 298 relative to the casing 10. The apertures 326 are elongated in form to permit longitudinal movement of the thimble 298 while preventing rotation thereof.

Bottomed in the cup-shaped element 328 is a bimetallic disc 330 which also engages the cup-shaped element 194. Thus, forces are transmitted from the power element 278 through the cup-shaped element 328, bimetallic disc 330, cup-shaped element 318, spring 316 and valve shaft 288 to the valve member 306, the bimetallic disc 330 serving to compensate for variations in ambient temperatures in a manner well known in the art.

Operation

When no fuel is flowing to a main burner, the various parts of the control device are positioned as shown in Fig. 5. To place the control device in operative condition, the knob 24 is depressed to release the locking plate 68 and is rotated to any desired temperature setting indicated by the indicia 25. This rotation will move the plug valve member 30 to a fluid flow permitting position and will transmit torque through the valve stem 86, the valve member 82, and the cylindrical protection 286 thus serving to move the threaded thimble 298 to the right as viewed in Fig. 5 and permitting the spring 302 to move the valve member 306 away from its seat. The valve member 306 will remain unseated until the temperature sensed by the bulb 274 causes the power element 278 to expand and move the valve member 306 toward its seat.

Although rotation of the knob 24 will cause opening of the plug valve 18 and thermostatically controlled valve 22, fluid flow from the inlet 12 to the outlet 14 will be prevented by the valve member 82 until the same is moved away from its seat by manual manipulation of the timer knob 180.

If it is desired to place the control device in operative position for a predetermined time period which is to begin immediately, the knob 180 is depressed to move the shaft 194 axially, carrying the followers 200, 202 out of the recesses 214, 218. Such movement of the shaft 194 will rotate the lever 152 in a clockwise direction about the pivot 168 moving the same against the bias of the spring 170 and permitting the lever 132 to overcome the biase of the spring 102 and to rotate in a counterclockwise direction under the bias of the spring 148. Such rotation of the lever 132 axially moves the thrust sleeve 106 to the right as viewed in Fig. 5, carrying the screw 124 and the shaft 86 therealong to position the valve member 82 away from the valve seat 84. Fluid fuel may then flow past the valve member 82 to the outlet 14 of the casing 10.

Figure 2:
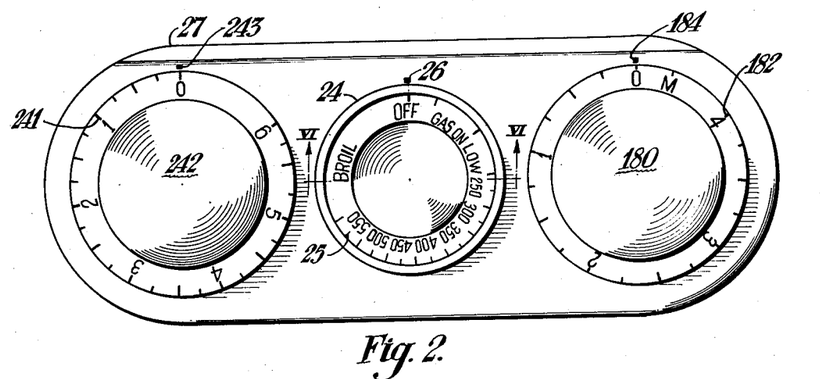
Fig. 2 is a front view of the control shown in Fig. 1.

The knob 180 is then rotated in a clockwise direction as viewed in Fig. 2 to a desired time setting indicated by the indicia 182 and the reference mark 184. Rotational movement of the knob 180 rotates the shaft 194 to move the followers 200, 202 into engagement with the helical surfaces 212, 216. As hereinbefore pointed out, the helix angles of the helical surfaces 212, 116 are such that the tendency towards rotational movement of the shaft 194 is balanced by the frictional force resisting such movement. The shaft 194 will therefore, remain in the position in which it has been set unless an additional torque is applied thereto to start rotation of the same and move the followers 200, 202 down the helical surfaces 212, 216 toward the recesses 214, 218, respectively.

It will be understood, that the sequence of the rotational movements of the knob 24 and the knob 180 may be reversed if desired with setting of the timer knob 180 preceding operation of the valve member 30 by the knob 24.

The rotational setting movement of the knob 180 also rotates the pinion 228 and winds the mainspring (not shown) of the clock movement 224. When the knob 180 is released, the torque of the mainspring is transmitted directly to the gear 226 and the pinion 228, the escapement mechanism (not shown) of the timer movement 224 controlling the speed of the rotation of the pinion 228, the plate 198, the shaft 194 and the knob 180 to their initial angular positions.

When the mainspring (not shown) has rotated the shaft 194 to its initial angular position, the followers 200, 212 are disengaged from the helical surfaces 212, 216 and, since the followers 200, 202 are then aligned with the recesses 214, 218, the shaft 194 will be moved rapidly downwardly as viewed in Fig. 4 until the followers 200, 202 engage the bottoms of the recesses 214, 218. Simultaneously with this axial movement of the shaft 194, the lever 152 under the bias of spring 170 will rotate in a counterclockwise direction carrying the downturned ends 158 therewith to move the lever 132 out of engagement with the thrust sleeve 106 to permit the engagement of the valve member 82 with the valve seat 84. Such movement of the levers 152 and 132, the sleeve 106 and the valve member 82 will occur with a snap action to prevent further flow of fluid to the outlet 14 of the casing 10 and the main burner.

When the followers 200, 202 move into the recesses 214, 218, further rotation of the shaft 194 is prevented. The clock movement 228 will then stall and further unwinding of the mainspring is prevented. Thus, the mainspring will never be permitted to run down and a substantial torque may be exerted thereby on the shaft 190 in all angular positions of the same to eliminate any danger of insufficient winding of the mainspring when the timer is set to operate at a small time interval. It is to be noted that since the followers 200, 202 are diametrically opposed to each other, they will engage and disengage the helical surfaces 212, 216 simultaneously thereby preventing possible tilting and binding of the shaft 194.

It it is desired to delay the aforementioned time period so that a cooking operation may be set to begin automatically after a predetermined time interval, the knob 242 is depressed to move the shaft 240 axially for carrying the follower plate 238 and moving its associated cam followers out of the recesses in the cam assembly 236. Such movement of the shaft 240 will cause rotation of the lever 132 in a clockwise direction against the bias of the spring 148 to move the lower section 138 of the lever 132 away from the flange 108 of the thrust sleeve 106. Thus actuation of the valve member 82 from its seat 84 is prevented.

The knob 242 is then rotated in a clockwise direction as viewed in Fig. 4, to a desired time setting indicated by the indicia 243 and the reference mark 243 on the frame 27. Rotational movement of the knob 242 rotates the shaft 240 to move the followers associated with the follower plate 238 into engagement with the helical surfaces of the cam assembly 236. Since the clock mechanism 176 is identical with the clock mechanism 174, the shaft 240 will remain in the position in which it has been set until the mainspring (not shown) of the clock mechanism 176 actuates the shaft 240 and move the followers associated with the plate 238 down the helical surfaces associated with the cam assembly 236.

When the mainspring (not shown) in the clock mechanism 176 has rotated the shaft 240 to its initial angular position, the shaft 240 will be moved rapidly downwardly as viewed in Fig. 4 permitting counterclockwise rotation of the lever 132 to effect engagement of the lower portion 138 with the flange 108 of the sleeve 106 under the bias of the spring 148. Since the biasing effect of the spring 170 and the biasing force of the spring 148 is greater than the biasing effect of the valve spring 102, the lower portion 138 of the lever 132 will axially move the sleeve 106 to effect opening of the valve member 82. The time cycle of the opening of the valve member 82 is now under control by the timing mechanism 174 as previously described.

It will be apparent from the foregoing that the illustrated embodiment provides a new and improved control device and accomplishes the objects of the invention. It will also be obvious to those skilled in the art that the illustrated embodiment may be variously changed and modified, or features thereof, singly or collectively embodied in other combinations than those illustrated without departing from the scope of the invention or sacrificing all of the advantages thereof, and that accordingly the disclosure herein is illustrative only and the invention is not limited thereto.

I claim:

1. A control device comprising a control element movable between operative and inoperative positions and biased to said inoperative position, actuating means operable against the bias of said control element for causing movement thereof to said operative position, first lever means biased for rotation in one direction for operating said actuating means, second lever means biased for rotation in another direction and cooperable with the bias of said control element for preventing said rotation of said first lever means, manually operable means for overcoming the bias of said second lever means thereby causing rotation of said first lever means in said one direction and movement of said control element to said operative position, and timing means operable for causing rotation of said second lever means in said other direction upon expiration of a predetermined time period thereby causing movement of said control element to said inoperative position.

2. A control device as claimed in claim 1 wherein said manually operable means is connected to said timing means for jointly rotating said second lever means and setting said time period.

3. A control device as claimed in claim 2 wherein said control element includes a valve member movable toward and away from a valve seat for establishing said inoperative and operative positions respectively.

4. A control device comprising a control element movable between operative and inoperative positions and biased to said inoperative position, actuating means operable against the bias of said control element for causing movement thereof to said operative position, first lever means biased for rotation in one direction from an initial position for operating said actuating means, second lever means biased for rotation in another direction and cooperable with the bias of said control element for preventing said rotation of said first lever means, first manually operable means for overcoming the bias of said first lever means and causing rotation thereof in said other direction for preventing movement of said control element to said operative position, time delay means operable for causing rotation of said first lever means to said initial position upon expiration of a predetermined time delay period, second manually operable means for overcoming the bias of said second lever means thereby causing rotation of said first lever means in said one direction from said initial position and movement of said control element to said operative position, and timing means operable for causing rotation of said second lever means in said other direction upon expiration of a predetermined time period thereby causing movement of said control element to said inoperative position.

5. A control device as claimed in claim 4 wherein said first manually operable means is connected to said time delay means for jointly rotating said first lever means and setting said delay period, said second manually operable means being connected to said timing means for jointly rotating said second lever means and setting said time period.

6. A control device comprising a casing having a seat, a control element movable between open and closed positions relative to said seat and biased to said closed position, an actuating stem operably connected to said control element and extending through said casing, first lever means pivotally mounted in said casing and operably engageable with said stem, said first lever means being biased for moving said control element toward said open position, second lever means pivotally mounted in said casing and operably engageable with said first lever means, said second lever means being biased for cooperation with the bias of said control element for preventing movement thereof to said open position by said first lever means, manually operable means engageable with said second lever means for overcoming the bias thereof and causing rotation of said first lever means under the bias thereof for moving said control element to said open position, and timing means operably associated with said manually operable means for rendering the same ineffective upon expiration of a predetermined time period thereby causing movement of said control element to said closed position.

7. A control device as claimed in claim 6 wherein said manually operable means is connected to said timing means for jointly rotating said second lever means and setting said time period.

8. A control device comprising a casing having a seat, a control element movable between open and closed positions relative to said seat and biased to said closed position, an actuating stem operably connected to said control element and extending through said casing, first lever means pivotally mounted in said casing and operably engageable with said stem, said first lever means being biased for moving said control element toward said open position, second lever means pivotally mounted in said casing and operably engageable with said first lever means, said second lever means being biased for cooperation with the bias of said control element for preventing movement thereof to said open position by said first lever means, first manually operable means engageable with said first lever means for overcoming the bias thereof and rendering the same ineffective for moving said control element, time delay means operably associated with said first manually operable means for rendering the same ineffective for overcoming the bias of said first lever means upon expiration of a predetermined time delay period, second manually operable means engageable with said second lever means for overcoming the bias thereof and causing rotation of said first lever means under the bias thereof for moving said control element to said open position, and timing means operably associated with said second manually operable means for rendering the same ineffective upon expiration of a predetermined time period thereby causing movement of said control element to said closed position.

9. A control device as claimed in claim 8 wherein said first manually operable means is connected to said time delay means for jointly rotating said first lever means and setting said delay period, said second manually operable means being connected to said timing means for jointly rotating said second lever means and setting said time period.

References Cited in the file of this patent

UNITED STATES PATENTS

| 1,860,159 | Porter | May 24, 1932 |
| 1,995,070 | Lux | Mar. 19, 1935 |